United States Patent [19]

Delucia et al.

[11] Patent Number: 4,819,233
[45] Date of Patent: Apr. 4, 1989

[54] VERIFICATION OF COMPUTER SOFTWARE

[75] Inventors: R. Ralph Delucia, Valencia; Daniel J. Wolf, Bethel Park; Eric P. Casteel, N. Huntingdon, all of Pa.

[73] Assignee: Westinghouse Electric Corp., Pittsburgh, Pa.

[21] Appl. No.: 35,802

[22] Filed: Apr. 8, 1987

[51] Int. Cl.[4] .............................................. G06F 11/00
[52] U.S. Cl. ....................................... 371/19; 364/200
[58] Field of Search ...................... 371/16, 19; 364/200

[56] References Cited

U.S. PATENT DOCUMENTS

| | | | |
|---|---|---|---|
| 3,427,443 | 2/1969 | Apple et al. | 371/19 |
| 3,522,597 | 8/1970 | Murphy | 371/19 X |
| 3,551,659 | 12/1970 | Forsythe | 371/19 X |
| 4,423,508 | 12/1983 | Shiozaki et al. | 371/16 |
| 4,571,677 | 2/1986 | Hirayama et al. | 364/200 |

Primary Examiner—Charles E. Atkinson

[57] ABSTRACT

A computer program is verified, unit by unit, by automatically instrumentating the code and generating a test driver program which executes all branches of an instrumented code unit. The code is instrumented by operating processors to standardize the code format and to insert executable tracer statements into each block of reformatted code between control statements. A pseudocode having only control statements and tables identifying valid linkages between blocks of code are generated by another processor for use by a verifier in selecting values of input variables and expected outputs for test cases which execute each block of code in the selected unit. Another processor generates the test driver program from the test cases and a software test specification identifying the test cases and expected results. The test driver program and instrumented code unit are compiled and linked to repeatively execute the instrumented code unit to implement all the test cases. Results of the test cases are printed out indicating the sequence of block linkages generated by each test case, the expected output values and the actual output values.

24 Claims, 19 Drawing Sheets

```
ex1:  DO WHILE (Test2 < 5.0);
         statement2;
         DO Index=Start to Finish;
            statement3;
            statement4;
         END ;
         statement5;
      END ex1;
```

FIG. 3.

```
DO CASE (Index);
   Index0:DO;
      statement0;
   END;
   Index1:DO;
      statement1;
   END;
   Index2:DO;
      statement2;
   END;
END;
```

FIG. 4.

```
DO CASE (Condition);
   DO;
      /*condition is 0*/
      statement;
   END;
   DO;
      /*condition is 1*/
      statement;
      statement;
   END;
   DO;
      /*condition is 2*/
      statement;
   END;
END;
```

FIG. 5.

```
      IF (Eval_exp) THEN
        DO;
          state8;
        END;
      ELSE
        /* expression is false */
        DO;
          IF (Eval_exp) THEN
            DO;
              state9;
            END;
          ELSE
            DO;
              state10;
            END;
          ENDIF;
          /* end of false case */
        END;
      ENDIF;
```

FIG. 6.

```
NV_WRITE_SEQ:PROCEDURE(Seq,ptr_to,ptr_from) PUBLIC;
  /* BLOCK 02 */
  IF SEQ = 3 THEN
    DO;     /* BLOCK 03 */
    END;    /* BLOCK 03 */
  IF SEQ > 0 AND SEQ < 3 THEN
    DO CASE Seq;
      K0:DO;    /* BLOCK 04 */
        DO WHILE (COUNT < 2);   /* BLOCK 05 */
        END;    /* BLOCK 05 */
      END K0;   /* BLOCK 04 */
      K1:DO;    /* BLOCK 06 */
        DO COUNT = 0 TO 2;      /* BLOCK 07 */
        END;    /* BLOCK 07 */
      END K1;   /* BLOCK 06 */
      K2:DO;    /* BLOCK 08 */
      END K2;   /* BLOCK 08 */
    END;
  END NV_WRITE_SEQ;    /* BLOCK 02 */
END DIAGNOSTIC_MODULE;
```

FIG. 8.

```
/* MARK */
    NV_WRITE_SEQ:PROCEDURE(Seq,ptr_to,ptr_from) PUBLIC;
/* DO */             /* ADDED BY CCP */
   DECLARE COUNT BYTE;
   DECLARE(ptr_to, ptr_from) pointer;
   DECLARE Nvram_Byte based ptr_to byte;
   DECLARE ram based ptr_from byte;
   DECLARE (Seq, temp) byte;
   SEQ = SEQ + 1;
   IF SEQ = 3 THEN
     DO;
     /* DO */            /* ADDED BY CCP */
       call deadman;
     /* END */           /* ADDED BY CCP */
     END;
   VV_ENDIF;
   IF SEQ > 0 AND SEQ < 3 THEN
     DO CASE Seq;
       KO:DO;
       /* DO */          /* ADDED BY CCP */
         DO WHILE (COUNT < 2);
         /* DO_WHILE */           /* ADDED BY CCP */
         /* erase mode */
           nv_portc=nv_portc and OCFH;
           Nvram_Byte = 0;
         /* END_WHILE */          /* ADDED BY CCP */
         END;
       /* END */         /* ADDED BY CCP */
       END KO;
```

FIG. 7a.

```
K1:DO;
/ *DO */           / *ADDED BY CCP */
  DO COUNT = 0 TO 2;
    / *DO_FOR */          / *ADDED BY CCP */
    / * dummy read terminates erase cycle */
    nv_portc=nv_portc or 030H;
    temp = Nvram_Byte;
    / * write mode */
    nv_portc=nv_portc and 0EFH;
    Nvram_Byte = Ram;
    / *END_FOR */         / *ADDED BY CCP */
  END;
/ *END */       / *ADDED BY CCP */
END K1;
K2:DO;
/ *DO */           / *ADDED BY CCP */
  / *dummy read terminates write cycle */
  nv_portc=nv_portc or 030H;
  temp = Nvram_Byte;
/ *END */     / *ADDED BY CCP */
END K2;
END;
VV_ENDIF;
/ * CASES */
/ *END OF IF THEN CONDITION */
/ *END */              / *ADDED BY CCP */
END NV_WRITE_SEQ;
/ *MARK_END */
END DIAGNOSTIC_MODULE;
```

FIG. 7b.

```
NV_WRITE_SEQ:PROCEDURE(Seq,ptr_to, ptr_from) PUBLIC;
/* DO */           /* ADDED BY CCP */   /* BLOCK 02 */
DECLARE COUNT BYTE;
DECLARE (ptr_to,ptr_from) pointer;
DECLARE Nvram_Byte based ptr_to byte;
DECLARE ram based ptr_from byte;
DECLARE (Seq,temp) byte;
CALL SETB('.', OVV_ASCII_DATA, 84H);
ACTLINKS(TRACEINX)= 2;    /* ADDED BY CIP */
TRACEINX=TRACEINX + 1;    /* ADDED BY CIP */
SEQ = SEQ + 1;
IF SEQ = 3 THEN
DO;
    /* DO */          /* ADDED BY CCP */   /* BLOCK 03 */
    ACTLINKS(TRACEINX) = 3;               /* ADDED BY CIP */
    TRACEINX=TRACEINX + 1;                /* ADDED BY CIP */
    CALL MOVB [0('.'  /* BEFORE DEADMAN */'.'), OVV_ASCII_DATA(2),18];
    CALL OUT_TO_PORT(6, OVV_ASCII_DATA, 64H);
    CALL OUT_TO_PORT(6, OVV_ASCII_DATA, 01H);
    call deadman;
    CALL MOVB [0('.'  /* AFTER DEADMAN */'.'), OVV_ASCII_DATA(2),17];
    CALL OUT_TO_PORT(6, OVV_ASCII_DATA, 64H);
    CALL OUT_TO_PORT(6, OVV_ASCII_DATA, 01H);
    ACTLINKS(TRACEINX)= 2;                /* ADDED BY CIP */
    TRACEINX=TRACEINX + 1;                /* ADDED BY CIP */
/* END */          /* ADDED BY CCP */   /* BLOCK 03 */
END;
```

FIG. 9a.

```
VV_ENDIF;
IF SEQ > 0 AND SEQ < 3 THEN
 DO CASE Seq;
  K0:DO;
   /*DO*/         /*ADDED BY CCP*/  /*BLOCK 04*/
     ACTLINKS(TRACEINX)= 4;      /*ADDED BY CIP*/
     TRACEINX=TRACEINX + 1;      /*ADDED BY CIP*/
     DO WHILE (COUNT<2);
      /*DO WHILE*/      /*ADDED BY CCP*/ /*BLOCK 05*/
       ACTLINKS(TRACEINX)= 5;       /*ADDED BY CIP*/
       TRACEINX=TRACEINX + 1;       /*ADDED BY CIP*/
       /*erase mode*/
       nv_portc=nv_portc and OCFH;
       Nvram_Byte = 0;
       ACTLINKS(TRACEINX)= 5;       /*ADDED BY CIP*/
       TRACEINX=TRACEINX + 1;       /*ADDED BY CIP*/
      /*END_WHILE*/      /*ADDED BY CCP*/  /*BLOCK 05*/
     END;
     ACTLINKS(TRACEINX)= 4;       /*ADDED BY CIP*/
     TRACEINX=TRACEINX + 1;       /*ADDED BY CIP*/
     ACTLINKS(TRACEINX)= 2;       /*ADDED BY CIP*/
     TRACEINX=TRACEINX + 1;       /*ADDED BY CIP*/
   /*END*/         /*ADDED BY CCP*/  /*BLOCK 04*/
   END K0;
  K1:DO;
   /*DO*/         /*ADDED BY CCP*/  /*BLOCK 06*/
     ACTLINKS(TRACEINX)= 6;   /*ADDED BY CIP*/
```

FIG. 9b.

```
         TRACEINX=TRACEINX + 1;      /*ADDED BY CIP*/
         DO COUNT = 0 TO 2;
         /*DO_FOR*/        /*ADDED BY CCP*/   /*BLOCK 07*/
           ACTLINKS(TRACEINX)= 7;      /*ADDED BY CIP*/
           TRACEINX=TRACEINX + 1;      /*ADDED BY CIP*/
         /*dummy read terminates erase cycle*/
           nv_portc=nv_portc or 030H;
           temp = Nvram_Byte;
           /*write mode*/
           nv_portc=nv_portc and 0EFH;
           Nvram_Byte = Ram;
           ACTLINKS(TRACEINX)= 7;      /*ADDED BY CIP*/
           TRACEINX=TRACEINX + 1;      /*ADDED BY CIP*/
         /*END_FOR*/       /*ADDED BY CCP*/   /*BLOCK 07*/
         END;
         ACTLINKS(TRACEINX)= 6;        /*ADDED BY CIP*/
         TRACEINX=TRACEINX + 1;        /*ADDED BY CIP*/
         ACTLINKS(TRACEINX)= 2;        /*ADDED BY CIP*/
         TRACEINX=TRACEINX + 1;        /*ADDED BY CIP*/
         /*END*/           /*ADDED BY CCP*/   /*BLOCK 06*/
         END K1;
         K2:DO;
         /*DO*/            /*ADDED BY CCP*/   /*BLOCK 08*/
           ACTLINKS(TRACEINX)= 8;      /*ADDED BY CIP*/
           TRACEINX=TRACEINX + 1;      /*ADDED BY CIP*/
         /*dummy read terminates write cycle*/
           nv_portc=nv_portc or 030H;
           temp = Nvram_Byte;
           ACTLINKS(TRACEINX)= 2;      /*ADDED BY CIP*/
           TRACEINX=TRACEINX + 1;      /*ADDED BY CIP*/
         /*END*/.          /*ADDED BY CCP*/   /*BLOCK 08*/
         END K2;
        END;
       VV_ENDIF;
       /*Cases*/
       /*END OF IF THEN CONDITION*/
       ACTLINKS(TRACEINX)= 2;         /*ADDED BY CIP*/
       TRACEINX=TRACEINX + 1;         /*ADDED BY CIP*/
       /*END*/           /*ADDED BY CCP*/   /*BLOCK 02*/
      END NV_WRITE_SEQ;
     END DIAGNOSTIC_MODULE;
```

```
♦ SECTION 3  CASE SPECIFIC INPUT INFORMATION                         SECTION 3 ₄₂
♦ CASE NUMBER 1-2
♦ INPUT VARIABLE NAME 4-73
♦ INITIAL VALUE 74-123
♦ SUBSCRIPT OR INDEX 124-129
*234567890123456789012345678901234567890123456789012345678901234567890
 00 SEQ                                                                       0
 00 TO_DATA                                                                 178
 00 FROM                                                                     43
 00 NV_PORTC                                                                  0
 0
 01 SEQ                                                                       1
 01 TO_DATA                                                                 178
 01 FROM                                                                     43
 01 NV_PORTC                                                                  0
 ♦
 02 SEQ                                                                       2
 02 TO_DATA                                                                 178
 02 FROM                                                                     43
 02 NV_PORTC                                                                  0
 ♦
```

FIG. 10b.

```
♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦
♦ SECTION 4  PROCEDURE/FUNCTION INVOCATION                                  SECTION 4 ⌐ 43
CALL NV_WRITE_SEQ(SEQ,OTO_DATA,OFROM);
♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦
♦ SECTION 5  CASE SPECIFIC OUTPUT INFORMATION                                 SECTION 5
♦ CASE NUMBER 1-2
♦ OUTPUT VARIABLE NAME 4-73
♦ EXPECTED VALUE 74-123
♦ SUBSCRIPT OR INDEX 124-129
♦2345678901234567890123456789012345678901234567890123456789012345678901234567890
00 TO_DATA                                                                    43
00 NV_PORTC                                                                   32
♦
01 TO_DATA                                                                   178
01 NV_PORTC                                                                   48
♦
02 TO_DATA                                                                   178
02 NV_PORTC                                                                    0
♦
♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦ ♦
```

FIG. 10c.

```
44—DO VV_=0 TO 2;
      TRACEINX= 0;
  45—ACTLINKS(TRACEINX)= 1;
      TRACEINX=TRACEINX + 1;
      DO CASE VV_1;
          DO;      /*CASE = 0*/
  46——(1)(assign input values for this test case);
            (2)(write test case #, input values and
                expected values to output file);
          END;
          DO;      /*CASE = 1*/
            (1)-----
            (2)-----
          END;
          DO;      /*CASE = 2*/
            (1)-----
            (2)-----
          END;
      END;
47—— CALL NV_WRITE_SEQ(SEQ,@ TO_DATA,@ FROM);
48—— CALL(write instructions for output format);
49—— ACTLINKS(TRACEINX)= 1;
     TRACEINX=TRACEINX + 1;
     DO CASE VV_1;
         DO;      /*CASE = 0*/
  50——(1)(write output values to output file);
            (2)(write block linkages to output file);
         END;
         DO;      /*CASE = 1*/
           (1)-----
           (2)-----
         END;
         DO;      /*CASE = 2*/
           (1)-----
           (2)-----
         END;
      END;
   END;
```

FIG. 11.

2.3 Input and Output Data (General)

| | |
|---|---|
| VARIABLE NAME: | SEQ |
| CLASS: | ARGUMENT |
| TYPE: | BYTE |
| QUALIFIER | VARIABLE |
| DATA FLOW | INPUT |
| VALID VALUE RANGE: | 1,2,3 |

| | |
|---|---|
| VARIABLE NAME: | TO_DATA |
| CLASS: | LOCAL |
| TYPE: | BYTE |
| QUALIFIER | VARIABLE |
| DATA FLOW | BOTH |
| VALID VALUE RANGE: | 0 - OFFH |

| | |
|---|---|
| VARIABLE NAME: | FROM |
| CLASS: | LOCAL |
| TYPE: | BYTE |
| QUALIFIER | VARIABLE |
| DATA FLOW | INPUT |
| VALID VALUE RANGE: | 0 - OFFH |

| | |
|---|---|
| VARIABLE NAME: | NV_PORTC |
| CLASS: | GLOBAL |
| TYPE: | BYTE |
| QUALIFIER | VARIABLE |
| DATA FLOW | BOTH |
| VALID VALUE RANGE: | 0 - OFFH |

FIG. 12.

TEST CASE # 0

TYPE OF TEST:

STRUCTURAL AND FUNCTIONAL

OPERATING MODE:

NORMAL

RATIONALE:

Test path    /— 51
      1, 2, 3, 2, 2, 1.

TIMING CRITERIA:

N/A

SIZE LIMITATION:

N/A

INPUT(S) AND VALUE(S):

SEQ = 0
      TO_DATA = 178    /— 52
      FROM = 43
      NV_PORTC = 0

EXPECTED OUTPUT(S) AND ITS(THEIR) VALUE(S)

TO_DATA = 0    —— 53
      NV_PORTC = 0

MISCELLANEOUS INFORMATION OR COMMENTS
   PERTINENT TO THIS TEST CASE:

FIG. 13.

```
PROCEDURE: NV_WRITE_SEQ    FILE ID:TA02823  DATE:25-SEP-86
♦♦♦♦♦♦♦♦♦♦♦♦♦♦♦♦♦♦♦♦♦♦♦♦♦♦♦♦♦♦♦♦♦♦♦♦♦♦♦♦♦♦♦♦
INPUT DATA CASE #  0
  SEQ            =     0
  TO_DATA        =   178
  FROM           =    43
  NV_PORTC       =     0
OUTPUT DATA CASE #  0                ACTUAL      EXPECTED
  TO_DATA        =    43                43
  NV_PORTC       =    32                32
BLOCK LINKAGES CASE #  0
     1, 2, 6, 7, 7, 7, 7, 7, 6, 2, 2, 1
INPUT DATA CASE #  1
  SEQ            =     1
  TO_DATA        =   178
  FROM           =    43
  NV_PORTC       =     0
OUTPUT DATA CASE #  1                ACTUAL      EXPECTED
  TO_DATA        =   178               178
  NV_PORTC       =    48                48
BLOCK LINKAGES CASE #  1
     1, 2, 8, 2, 2, 1
INPUT DATA CASE #  2
  SEQ            =     2
  TO_DATA        =   178
  FROM           =    43
  NV_PORTC       =     0
OUTPUT DATA CASE #  2                ACTUAL      EXPECTED
  ♦♦ BEFORE DEADMAN ♦♦
  ♦♦ AFTER DEADMAN  ♦♦
  TO_DATA        =   178               178
  NV_PORTC       =     0                 0
BLOCK LINKAGES CASE #  2
     1, 2, 3, 2, 2, 1
```

FIG. 14.

VERIFICATION OF COMPUTER SOFTWARE

BACKGROUND OF THE INVENTION

1. Field of the Invention

This invention relates to a method and apparatus for testing new and revised computer programs by automatically generating, executing and documenting a customized test program using minimal user input.

2. Background Information

Many plant processes today are monitored, and to varying extents, controlled in the plant control room using signals sent from instrumentation located throughout the plant. One such process plant is a nuclear power plant. Although many operations in the control room are manual, the remaining majority are automatically performed through circuitry involving programmed microprocessors or programmable digital computers. Many of the programs used in these microprocessors and computers are critical to safe plant operation and consequently their accuracy and integrity is important.

In a typical power plant there can be about 1200 or more of these control and monitoring programs. Currently they are verified and validated through a visual examination of the code coupled with an independent physical testing of each program segment to insure proper operation of the program. Although the visual review has proved to be very effective in validating a program, Regulatory Guideline 1.97 issued by the Nuclear Regulatory Commission requires that equipment which provides data acquisitions and qualified display functions within the control room be tested in a more stringent manner. The physical tests have been performed to date using a demonstration unit of the actual hardware which permits access to the memory locations for the input parameters and output parameters. In order to isolate the piece of software to be tested, the desired test values of the input parameters are entered directly into the assigned memory locations in the demonstration unit, and the program is run. The outputs are extracted from the output memory locations for manual comparison with the expected values.

Such testing places the full burden on the verifier to devise a test program which executes all instructions and all possible branches in the program. This requires a great deal of skill on the part of the verifier and there is no direct record that all paths of the program have been exercised. Furthermore, since each program may require a multitude of tests to exercise all branches, the process becomes extremely time consuming and complete.

Accordingly, it is a primary object of the present invention to provide a method and apparatus for testing computer programs which automatically generates, executes and documents a customized test program using minimal user input.

SUMMARY OF THE INVENTION

This and other objects are realized by the invention which comprises instrumenting a source code to be verified and generating a test driver program which is compiled and linked to the instrumented source code to successively execute the source code to implement a series of test cases. The source code is instrumented by processors to generate, when the code is executed, an indication for each block of code that the statements of that block have been executed A block of code comprises the program statements between control statements. Thus, when the instrumented code is executed by the test driver program, an output is generated indicating the blocks of code which have been executed Through a properly devised series of tests, all of the blocks of code are executed The test cases are generated by selecting values for the input variables of the target code. The expected values for the output variables of the target code are also determined, so that the actual program output values generated by execution of the test cases can be verified.

Preferably, the source code to be verified is . first reformatted in accordance with a standardized set of formatting rules to produce a standardized reformatted source code. A unit at a time of this reformatted source code is then instrumented and verified; a unit being a routine or other convenient portion of the source code.

In instrumenting the source code, non-executable comments with a unique block identifier are inserted at the beginning and end of each block of the target unit of code. A block data table is generated listing the block identifiers, the nesting level of each block, the block through which each block is entered, and an indication of whether a block is a loop back block. A block linkage table is also generated from the control statements setting forth all valid transitions between blocks. An executable instruction is then inserted at the beginning of the block to write to an output file the block identifier when the block is executed. Another execurable instruction is inserted at the end of the block indicating the block to which control reverts after all the statements in the block have been executed. As the program is executed by the test driver, the block identifiers are written to a one dimensional array in an output file as each block is executed.

Where the target code unit calls another routine, executable write instructions are inserted by a processor before and after the call statement to generate in the output documentation an indication that the call statement was reached and that the program returned to the correct location after the call. If desired, instructions for writing to the output file the value of selected variables before and after the call can also be inserted by the processor into the target code unit.

Also in accordance with the invention, a pseudocode can be generated by a pseudocode processor from the reformatted target code unit. The pseudocode contains only the control statements, with comments between identifying the blocks of code using the same identifiers as the instrumented code. The pseudocode processor can also generate the block data table and linkage table generated by the instrumenting processor.

The verifier examines the source code, all available documentation and the pseudocode and block data and linkage tables generated by the pseudocode processor to select test cases which will execute all blocks of the target code unit. The selected values of input variables and expected outputs for each test case are entered through a user-friendly interface and arranged by a test generator processor in a variable file. The Test Data Processor then uses this data to generate a test driver program for implementing the test cases. The variable file can also be used to determine which test cases are affected when a variable is changed. The test driver processor also generates a test specification which sets forth the inputs, expected outputs and block linkages for each test case implemented by the test driver program.

The test driver program is compiled and linked with the instrumented target code unit and the resultant program is executed to successively execute the target code unit for each test case. Final documentation includes: in addition to the pseudocode, the block data and linkage tables, and the software test specification, outputs listing the values of the input variables, the actual values of the output variables together with the expected values, and the actual sequence of block linkages.

The invention, which encompasses both the method and apparatus for verifying computer source code, simplifies the verification process so that it can be carried out more rapidly and with a greater degree of standardization and confidence than is presently available.

BRIEF DESCRIPTION OF THE DRAWINGS

A full understanding of the invention can be gained from the following description of the preferred embodiments when read in conjunction with the accompanying drawings in which:

FIGS. 3 through 6 illustrate examples of formatting rules used in the exemplary embodiment of the . invention to standardize formatting of the target code;

FIGS. 7a and 7b illustrate a piece of target code reformable in accordance with the standardize formatting rules of the exemplary embodiment of the invention;

FIG. 8 illustrate a piece of pseudocode generated in accordance with the invention;

FIGS. 9a, 9b and 9c taken together illustrate a segment of target code fully instrumented in accordance with the exemplary embodiment of the invention;

FIGS. 10a, 10b, and 10c taken together illustrate a user speclfied information rile list generated by the test generator processor in accordance with the exemplary embodiment of the invention;

FIG. 11 illustrates portions of a test driver program generated by the test data processor in accordance with the exemplary embodiment of the invention;

FIGS. 12 and 13 illustrate portions of the software test program file generated by the test data processor in accordance with the exemplary embodiment of the invention;

FIG. 14 illustrates the of matting of output results in accordance with the exemplary embodiment of the invention.

DESCRIPTION OF THE PREFERRED EMBODIMENT

Figure 1A:
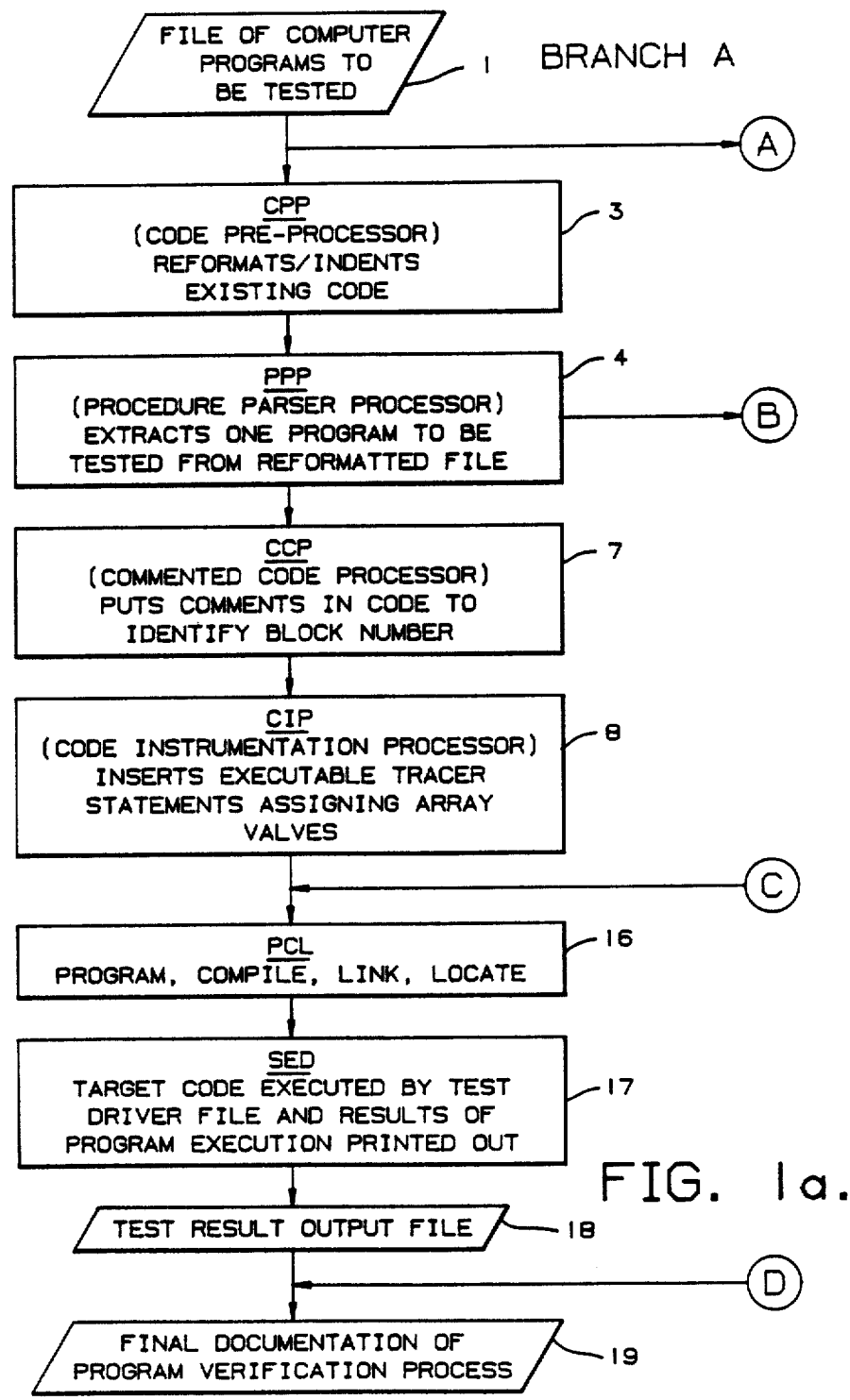
FIGS. 1a, 1b, and 1c when joined together side by side as indicated by the circled tags, illustrate a flowchart of the automated software verification system of the invention.
Figure 1B:
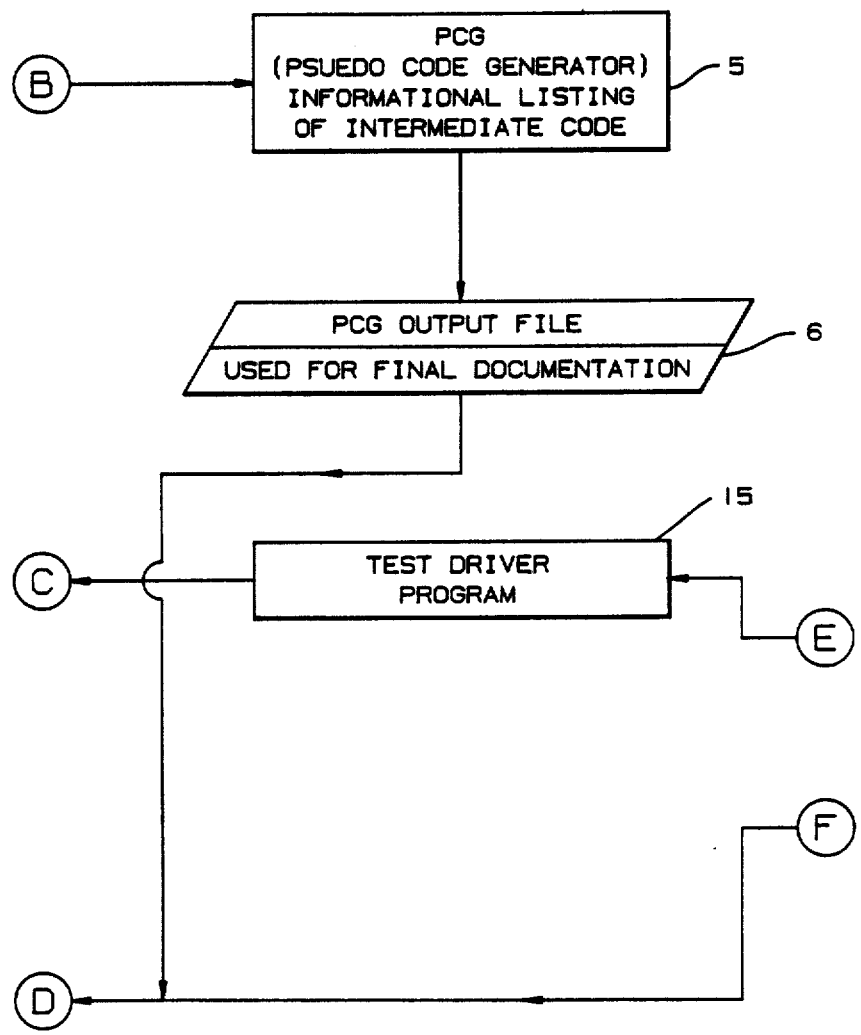
Figure 1C:
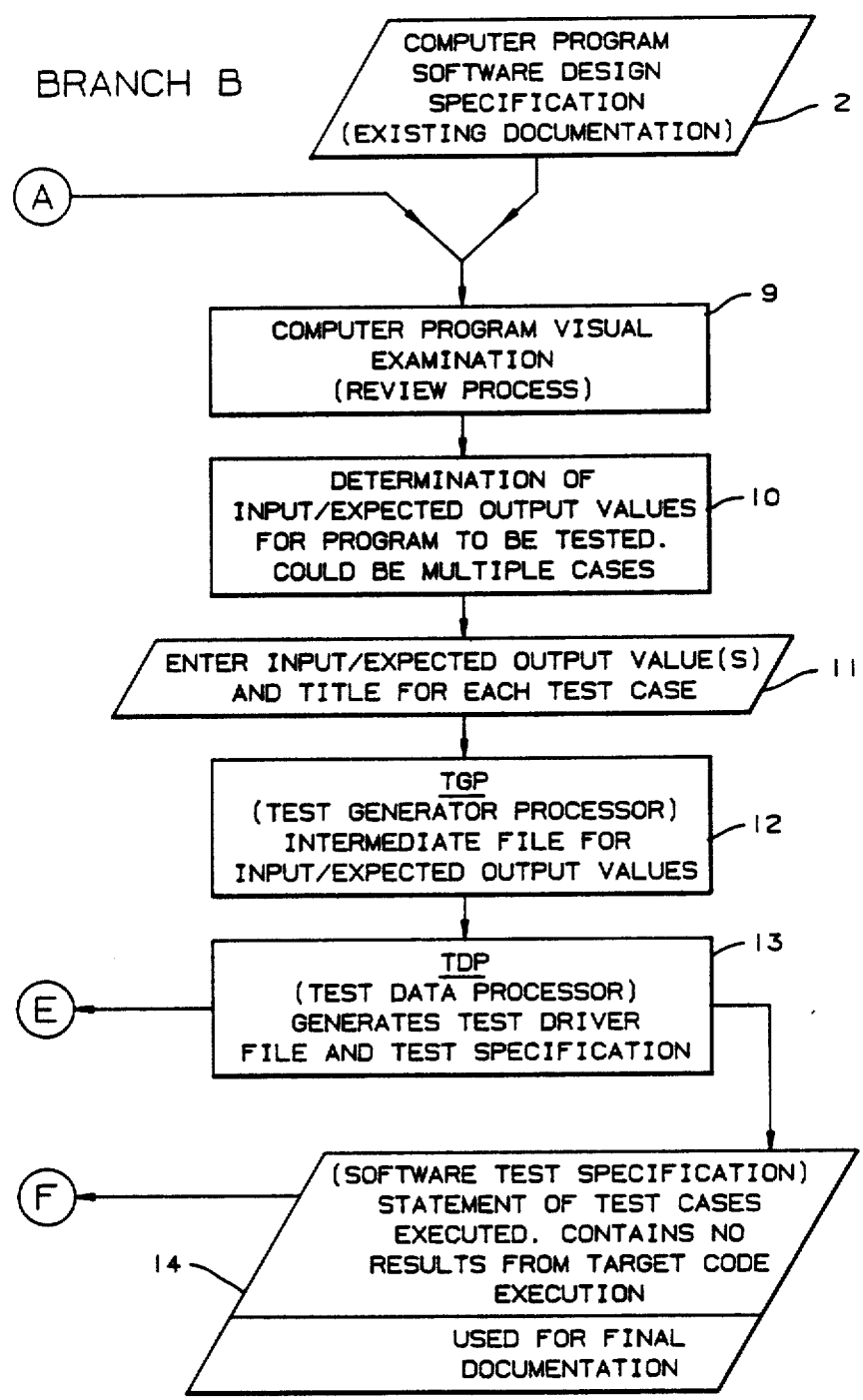

The invention will be described as applied to . automatically verifying applications software for the microprocessors in a digital, integrated protection and control system for a nuclear power plant. However, it will be become apparent that the invention is equally applicable to verifying all types of software.

General Description

The automated software verification system of the invention is a series of computer programs, some interactive, used for testing target computer programs by automatically generating, executing and documenting a customized test program using minimal user input. Verification is carried out on a general purpose digital computer, even though the target programs may be designed for use on microprocessors. The software system is divided into a number of independent processors to facilitate modifications to the system.

The initial step in the verification process is standardization of the formatting of the target program source code. The formatting used by various programmers, and indeed the formatting of an individual programmer within a given program, can vary considerably. The initial processor reformats the entire source code according to standardized rules. While this formatting is not essential to the practice of the invention, it simplifies the tasks of the other processors. A specific program from the target program system is then extracted for testing from the reformatted file. A pseudocode generator then extracts from . the target program an informational listing of only the control statements in the target program. These control statements are identified as blocks and given a block number. The pseudocode generator also generates a block data table indicating how each of the blocks is entered and identifying whether the block is a look back or not. In addition a linkage table is generated which identifies all valid branching between pairs of blocks. This informational block data table and linkage table are mace available to the human verifier for use in setting up the test program.

In a parallel path, a commented code processor inserts block identification comments corresponding to those used by the pseudocode generator into the target source code. A code instrumentation processor then inserts executable tracer statements into each clock of the source code. These tracer statements are printed out when the test is run to verify that each of the blocks has in fact been exercised. This instrumented code is then ready for testing. The human verifier examines the target source code along with the program software design specification, and any other documentation available, and together with the informational block data table and linkage table selects test conditions which will exercise al- branches of the program. In doing this, the verifier selects input values for the various variables and determined what the expected output values should be. For a complex program this may involve the generation of many test cases.

Detailed Description

A flow chart of the automated software verification system of the invention is set forth in FIGS. 1a, b, and c. The verifier, the person to test the target code, receives a file of programs to be tested 1 along with a design specification 2 written by the programmer. The verifier must analyze the target code and its documentation to insure that the documentation is adequate and accurate, and must exercise the actual target code through a custom-built test driver program which verifies that the target code operates properly.

It will be noted from FIGS. 1a, b and c that there are two separate parallel branches A and B in the functional diagram. Branch A depicts a series of processors which condition the target code by inserting statements so that upon execution there will be means to trace and record the path of execution as well as all input and output values for each test case within the verification process. This is the primary function of items 3–7 in FIGS. 1a and b. These trace statements and input/output values provide the necessary documentation for the verification process when the target code is executed.

Branch B depicts the review and test specification process. Using the design specifications 2 written by the programmer describing the purpose of the target code, and viewing a copy of the original code 1, the verifier must select 9 a series of test cases with a appropriate input value to test all of the existing branches within the instrumented code, while also confirming that the output values are predictable and accurate. This procedure is identical and just as strenuous with as without the automatic software verification system, out the data input, code conditioning and generation of control statements is greatly simplified by this system. The verifier enters 10 the input and expected output values for each test case, and branch B processes the test data entered 11, and generates 12 a test driver programmer that will execute the "conditioned" code generated in branch A.

All of the processors implemented within the exemplary automated software verification system were developed with PL/M86, used by Intel Corporation in their microprocessors, as the target language. It is important to understand that the basic guidelines around which these processors were developed are universal to any block-structured language and thus these processors can be modified so that they can handle a wide variety of programming languages such as for instance, Pascal, PL1, and Structured FORTRAN, among others. A program source file for Intel PL/M86 is referred to as a "MODULE". In order to provide an orderly mechanism so each piece of software within the total software hierarchy can be quickly and easily tagged, the following conventions have been implemented: Each 'MODULE' within the total software system is uniquely identified with a five (5) character alphanumeric base designator followed by a three (3) character alpha-numeric extension.

EXAMPLES: TA028.PLM, RA039.ASM, FI00-7.INC, FD020.DEC

The first two letters (i.e. TA, RA, FI, FD) are utilized to categorize the software 'MODULE' by software system/sub-system.

The next three numbers (i.e. 028,039,007,020) identify a unique 'MODULE' within a specific software system/sub-system.

The last three letters (i.e. the extension portion) denote a specification functional type of PL/M86 source file:

PLM - PL/M86 program source file
ASM - PL/M86 assembly program source file
INC - PL/M86 Include file
DEC - PL/M86 Declaraction file A PL/M86 program source file (i.e. "MODULE" in PL/M86 terminology) may contain anywhere from 1 to 99 subprograms, which are commonly referred to as procedures or functions, or in PL/M86 terminology, "UNITS". The actual PL/M86 program source file itself consists of three functional parts:

1. Header portion

The 'MODULE' "Header" contains all the source code (including comment lines) within a 'MODULE' exclusive of: (1) The module's "end" statement, and (2) all the code required to implement a publicly or locally declared subprogram (i.e. procedure or function) within the 'MODULE'.

EXAMPLE: TA028.HDR is the neader portion only of software 'MODULE' TA028.

2. Program portion

The individual subprograms that exist within the 'MODULE'. These subprograms are numbered sequentially from one (1) to ninety-nine (99) according to their physical order within the 'MODULE'. Each of these subprograms within the 'MODULE' are called 'UNITS'

EXAMPLE: TA02823.UNT is the twenty-third "UNIT" within "MODULE" TA028.

3. End portion

That part of the 'MODULE' which follows the end of the laser subprogram.

EXAMPLE: TA028.END is the end portion only of software "MODULE" TA028.

Figure 2:
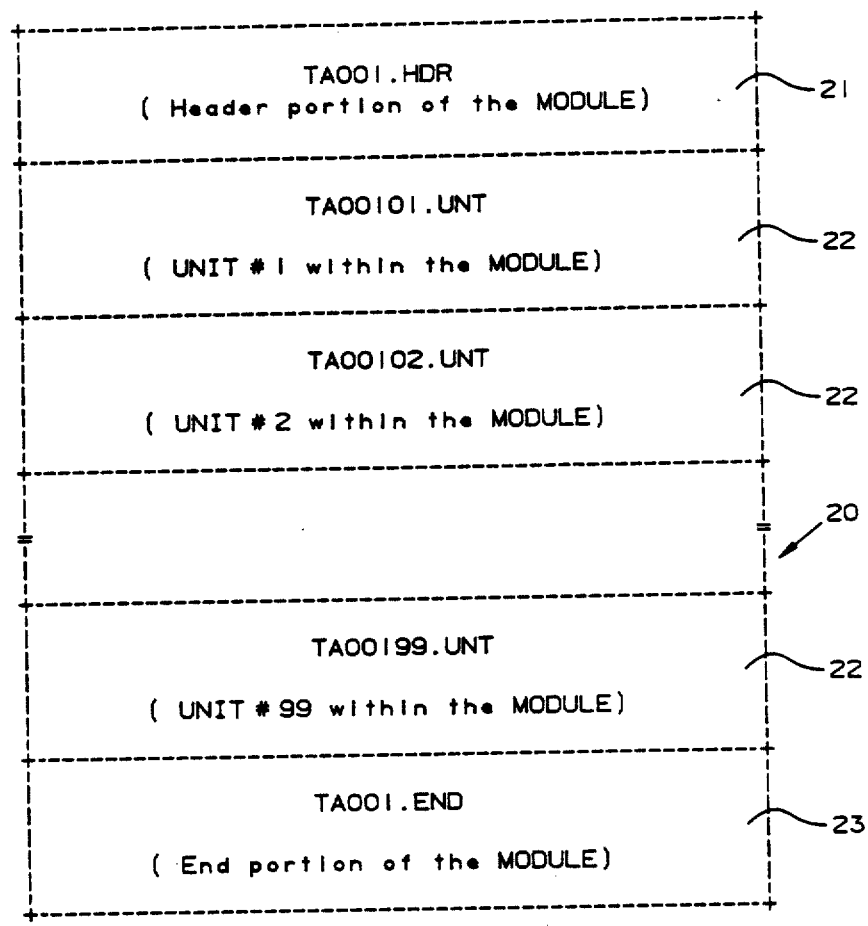
FIG. 2 illustrates the organization of a module of exemplary software to be verified by the invention.

The physical structure of a PL/M86 'MODULE' is illustrared in FIG. 2. As shown there, the module 20 includes a header portion 21 a seres of up to 99 subprograms or 'UNITS' 22, and an end portion 23.

As shown in block 3 of FIG. 1a, the code preprocessor (CPP) reformats the file of computer programs 1 to be tested. The CPP generates a syntactically correct program file from a successfully compiled PL/M86 program. CPP pre-formats and indents the original PL/M86 source program file line-by-line utilizing the program coding standards which follow. Cpp does not alter the execution of the original source code, but merely makes all PL/M86 source code programs appear to be very similar in format, irrespective of who the original programmer was. This standardizing of the program's format makes it more understandable to an individual other that rhe originator of the code. It also facilitates the implementation of other pre-processors, i.e. PPP 4, CCP 7, PCG 5, CIP 8, etc., without which it would have been very difficult for them to handle all the varying codes' styles in formats encountered from programmer to programmer.

The block structure of the PL/M86 language is emphasized in the reformatting to insure that the program is easy to read and that its function is clear. The following rules show how block structures are formatred in the exemplary system. Of course, the particular rules selected are not critical as long as the objective of achieving a standardized format is realized.

A. Indentations

Indentations will be 2 spaces

B. 'DO' Statements

The opening 'DO' statement and its corresponding 'END' statement will have the same left justification. Within the block, statements will be indented. Each new level of nested block within a block produces further indentation. Complex 'DO' blocks may have labeled outer 'DO' and 'END' statements. Caution is to be used when labeling inner blocks because it disturbs the indentation structure and clarity; comments should be used instead.

All expressions used in 'DO CASE' or 'DO WHILE' statements will be enclosed in parentheses. An example of a labeled 'DO WHILE' block with a nested inner 'DO-END'block is shown in FIG. 3. 'DO CASE' blocks must contain an enclosing 'DO' and 'END' around expressions to help identify paths outlined by such blocks. Statement labels or comments may be used on the first line of every case. Every 'DO CASE' block must be preceded by a check for valid index range. A 'DO CASE' block with 'DO' and 'END' delimiters for each individual case, is shown in FIG. 4. A 'DO CASE' block with 'DO' and 'END' delimiters for each individual case as well as comments is shown in FIG. 5.

C. 'IF' Statements

The evaluation expression will always be enclosed in parentheses and executable statements will always be indented. 'DO' blocks should be used ar all times. When 'DO' blocks are used, the rules concerning them will apply. 'THEN' will appear on the same line as the 'IF', with the 'DO' starting on the next line with proper indentation. 'ENDIF' is literally defined as 'DO;END' and is used to close off an 'IF' block. It will be left justified with the beginning 'IF'.

When 'IF' statements are nested after the 'THEN', 'DO' blocks and the 'ENDIF' construct must always be used.

When sequential 'IF' statements are used ('IF' statements nested after the 'ELSE'), 'DO' blocks must always be usec around the 'IF' statements. An example of rhe nested and sequential constructs is shown in FIG. 6.

2. Dual Case Alphabet

The ability to use upper and lower case letters allows another level of clarity to be added to the source code. Under this rule, upper case letters are used for block structure related words, such as for example 'DO', 'ENDS', 'IF', et cetera, while lower case letters are used for all else.

3. Comment Structure

Comments within code should be at the first column or starting at rhe same column position as the indented code on the preceding line of code being commented. A comment may be used before a complete block of code to explain its functionality.

An example of a segment of a program reformatted in accordance with the above rules is shown in FIGS. 7a and b.

The next processor is the Procedure Parser Processor (PPP) 4. PPP is utilized to automatically select "the" proper program to be tested (i.e. verified) from a PL/M86 source file which may contain many programs. This eliminates the possible error(s) introduced by the individual verifiers if they were to manually cut and paste the original PL/M86 program source file to extract the desired program. PPP requires that the PL/M86 source file must have been run through the CPP pre-processor first.

PPP extracts the following from the CPP'd PL/M86 program source file:

1. The header portion of the 'MODULE' (i.e. TA028.HDR).
2. The designated 'UNIT ' (or subprogram) within the 'MODULE' to be verified (i.e. TA028.23)
3. The end portion of rhe 'MODULE' (i.e. TA00-2.END).

It then generates a modified PL/M86 program source file which is identified, for example, as (TA02823.PLM) and consists of the following:

1. The extracted headed portion of the original 'MODULE' (i.e. TA028.HDR).
2. Immediately followed by the insertion of a /*MARK*/ character string to denote the state of the 'UNIT' (i.e. subprogram) to be verified.
3. The extracted 'UNIT' ro be verified (i.e. TA02823 UNT).
4. Immediately followed by the insertion of a /*MARK END*/ character string ro denote the end of rhe "UNIT" to be verified.
5. The extracted end portion of the original 'MODULE' (i.e. TA023 END)

Thus, the output of PPP (i.e. TA02823.PLM) has the following structure:

| | |
|---|---|
| TA028.HDR | Original header from TA028.PLM |
| /*MARK*/ | Commented 'MARK' statement |
| TA02823.UNT | Specific TA028 'UNIT' under test |
| /*MARK END*/ | Commented 'MARK END' statement |
| TA028.END | Original end from TA028.PLM |

This modified source file is used as the working copy of the unit to be verified.

The next processor is the pseudocode generator (PCG) 5 which is entirely informational and does not effect the working copy of rhe program. The PCG takes the program 'UNIT' extracted from the module by the PPP and performs two functions. First the procedure scans the code and identifies any executable instructions that could result in the transfer of program control via branching within the program. This methodology is based upon what is defined as a "BLOCK" of code. A "BLOCK" of code consists of a series of execurable software statements that are always executed from beginning to end in the same exact order. Normally these "BLOCKS" of code are separated by what is known as "CONTROL" statements which in turn determine which "BLOCK" of code is to be executed nexr. Each "BLOCK" of code is identified with a multiple-digit numeric code known as its . "BLOCK #". Each "BLOCK" of code is also assigned a "LEVEL #" which identifies the "BLOCKS'" nesting level. The nesting level of a "BLOCK" of code is a measure of how many control statements must be executed in order to reach rhat "BLOCK" of code. The PCG deletes all of the text between the control statements and puts in its place a simple "BLOCK nn" comment statement where "nn" describes the block number in its sequential position from the beginning of the program. The purpose of this is to highlight the areas of code that must be tested for verification. FIG. 8 illustrates the pseudocode generated by PCG for the unit shown in FIGS. 7a and b.

The second function of PCG is determining all possible branching within the program unit. In performing this function PCG generates two data tables. The first is the block data table, an example of which follows and is identified as Table 1. This table identifies the block number, the level number and the contiguous block, which is the path by which the block is entered.

The level number in the block data table indicates the nesting level of the block. A counter which keeps track of the nesting level increments with 'DO' statements and decrements with 'END' statements. Finally, the block data table indicates whether the block is a loop-back block with a "T" if it is true and an "F" if it is false.

TABLE 1
BLOCK DATA TABLE

| Block # | Level # | Contiguous Block # | Loop-back Block |
|---|---|---|---|
| 1 | 1 | 0 | F |
| 2 | 2 | 1 | F |
| 3 | 3 | 2 | F |
| 4 | 3 | 2 | F |
| 5 | 4 | 4 | T |
| 6 | 3 | 2 | F |
| 7 | 4 | 6 | T |
| 8 | 3 | 2 | F |

The second table generated by PCG is the linkage table identified as Table 2 below. This Table defines all the possible branching that can occur when the code is executed.

TABLE 2

LINKAGE TABLE

| (1,2) | (2,1) | (2,3) | (3,2) | (2,4) | (4,2) | (4,5) | (5,4) |
|-------|-------|-------|-------|-------|-------|-------|-------|
| (2,6) | (6,2) | (6,7) | (7,6) | (2,8) | (8,2) |       |       |

PCG combines the pseudocode along with the two data tables into a single common output file 6, for instance, TA02823.PCG, which is used for final documentation.

The Commented Code Processor (CCP) 7, like PCG, utilizes the output from PPP as irs input. CCP is similar to PCG, in fact the two processors have common code that both utilize. Whereas PCG was for informational use only to the verifier, CCP is vital to the proper operation of the code instrumentation processor (CIP) 8. As with PPP and PCG, CCP helps to minimize error(s) introduced by the individual verifier by utilizing a standard, consistent set of rules independent of the code being verified. CCP searches the code line-by-line for the same control statements as PCG. This time, however, code is not deleted, but non-executable comment cards are inserted into the target code to mark the beginning and the end of each block of code. Thus CCP identifies each "BLOCK" with the unique "BLOCK #" which is identical to that assigned by PCG to the same block of code. In addition, CCP inserts a commented 'DO' statement (i.e. /*DO*/) immediately preceding each "BLOCK" of code and a commented 'END' statement (i.e. /*END*/) immediately following each "BLOCK" of code. It also distinguishes between the 'END' statement for a normal DO' 'END' 'BLOCK' construct and the 'END' statement for a loop-type 'DO' 'BLOCK' construct (i.e. 'END FOR', 'END WHILE', etc.). It also indicates which commented 'DO' and 'END' statements it has inserted within the program by placing an "/*ADDED BY CCP*/" PL/M86 comment statement beside them. This is for traceability purposes only and is not utilized by CIP.

CCP writes this commented 'DO END' version of the program source code to a file (i.e. TA02823.PRE). CCP also generates the same two data tables as PCG, but writes them to a separate file (i.e. TA02823.TAB). Both of these files are utilized by the Code Instrumentation Processor (CIP) 8.

The Code Instrumentation Processor (CIP) 8 utilizes the comments added by CCP as markers to insert executable tracer instructions at the beginning and end of blocks of code between control statements, and to categorize each block with a sequential number. The blocks are numbered by CIP in the same way that the PCG procedure numbers the blocks. The executable instructions set the value of an element in a one dimensional array to the respective block number when that block is entered and the block to which control reverts when the block is exited during execurion. In this manner, a tracing of the program execution path may be easily generated by printing out the array values, which will show entry into and exit from each block executed in the program.

CIP also identifies which executable statement it has inserted into the program by placing a "/*ADDED BY CIP*/" PL/M86 comment statement beside them. It also identifies the actual "BLOCK #s" that it has assigned when processing CCP's commented single 'DO' and 'END' statements by placing a "/*BLOCK nn*/" PL/M86 comment statement where "nn" is the actual "BLOCK #" assigned by CIP at the beginning and end of each "BLOCK". As with CCP, this is done for traceability purposes only.

FIGS. 9a, b, and c illustrate the fully instrumented piece of code shown in FIGS. 7a and b. As can be seen, each of the blocks is sequentially identified in the same manner as in the pseudocode of FIG. 8 by the "BLOCK nn" comments such as for instance the comments 24 and 25 at the beginning and rhe end of Block 3 respectively.

The execurable tracer instructions used in the instrumented code of FIGS. 9a, b and c are the ACTLINKS statements which write the appropriate block number in a one dimensional array at a location indicated by TRACEINX. For instance, the ACTLINKS statement 26 writes into the array the numeral "3" indicating that the block 3, has been entered. The numeral "3" is stored in the array at the location indicated by the value of TRACEINX. TRACEINX is then incremented by one as indicated at 27 in preparation for the next entry. At the end of block 3 another ACTLINKS statement 28 inserts a "2" in the one dimensional array indicating that control has been transferred back to block 2. Again TRACEINX is incremented by 1 in preparation for the next entry as at 29.

The instrumented code of FIGS. 9a, b and c also illustrates another feature of the invention. It will be seen that block 3 calls another routine identified as "deadman" as indicated by the statement "call deadman" 30. CIP inserts before the call statement a series of statements which print out as the program is executed "before deadman". These instructions include a move byte instruction 31, a write to output file instruction 32 and a line feed instruction 33. Similarly after the call instruction, the CIP processor inserts instructions which . write to the output file, "after deadman", implemented by the instructions 34, 35 and 36. This sequence verifies that the target routine reached the instruction to called the external routine and rhat the program returned from the called routine to the proper place in the target program. Although not implemented by the code shown in FIGS. 9a, b and c the CIP processor can also provide for writing to the output file the values of the target unit variables both before and after the transfer to the called routine to monitor any affect that routine may have on the variables.

At this point, the target code has been reformatted and all possible areas of branching have been identified with a block number. Also code has been inserted within the target code to set the appropriate value in a one dimensional array of the block number when that particular section of code is executed. Also code has been inserted to verify that the program returns to the proper place from a called routine, and if desired, the values of the variables before and after the call. Up to this point the only input required from the verifier was the sequential position of the program to be extracted from the module.

The verifier must now become familiar with the computer program software design specification 2 written by the programmer describing exactly the function and purpose of the program. Also, the verifier must become familiar with of the actual target code which is contained in the file 1. The verifier must visually analyze and compare the target code against the design specifications 9. With this information, the verifier must determine 10 input values and expected output values that will be used to test the target code. The pseudocode, block data table and block linkage table generated by PCG at 5 are useful in enabling the verifier to devise input values that will execute each of the blocks in the target code. With the input/expected output values determined, this data along with appropriate identification for the different test cases must be manually input to the test generator processor (TGP) 12.

Figure 10A:
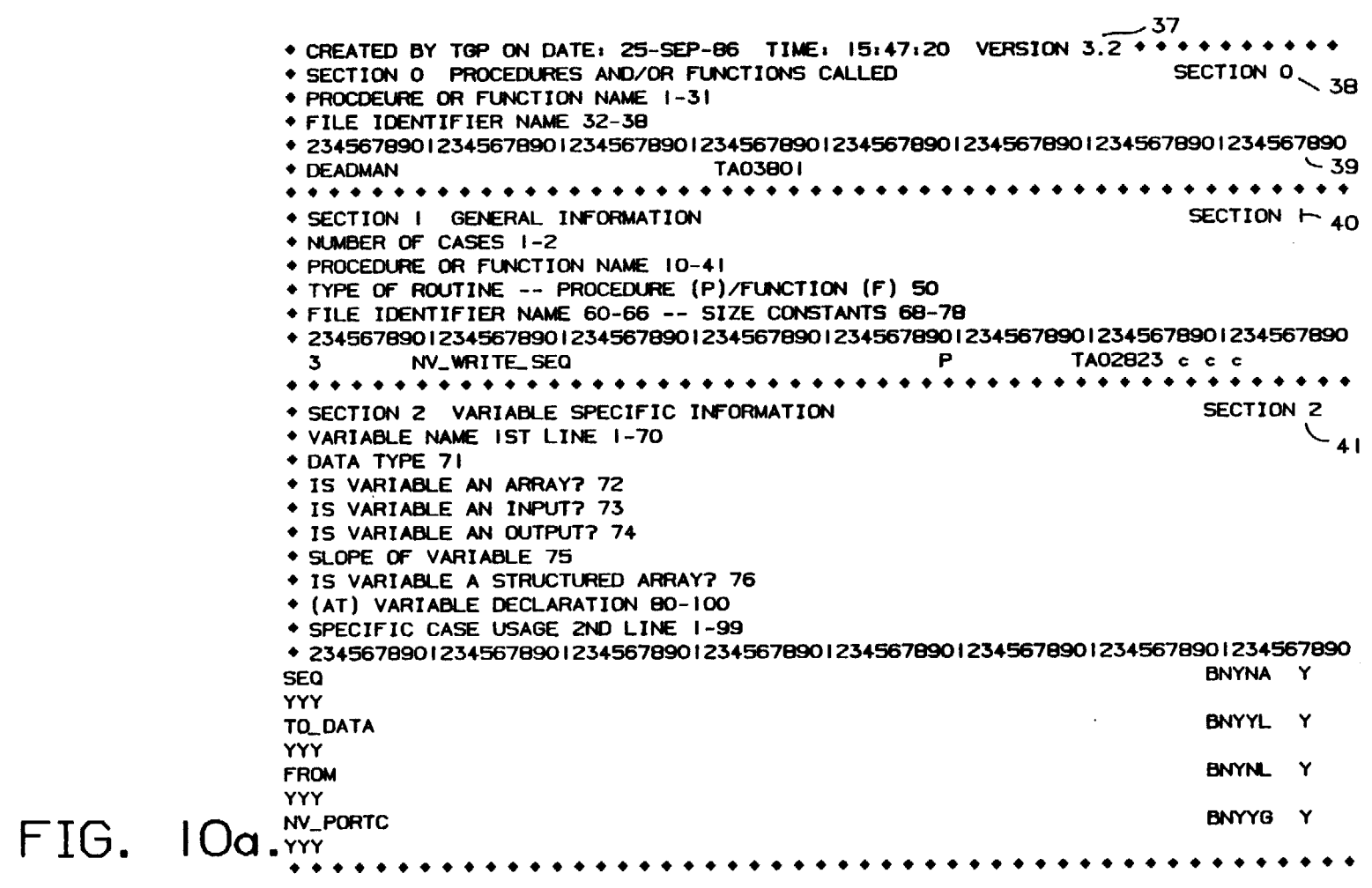

The Test Generator Processor 12 is used to request and receive data from the verifier in a user-friendly format and to arrange it in a formatted manner compatible with the target code. TGP also insures that the verifier has entered a complete and consistent set of data. A user Specified Information file list generated, also referred to as the variable file, by TGP is divided into sections. An example of such a file list is shown in FIGS. 10a, b and c. The first line 37, or file header indicates the date and time of generation of the file and the version of TGP. This provides an audit trail of each execution through the test bed. Section 0 indicates the procedures and/or functions called; in this case the "deadman" routine. The lines preceeded by astericks are comments which identify the information by column appearing in the line 39. For instance the called procedure or function name is indicated in columns 1-31. In this case "deadman" only takes up columns 1-7. The file identifier, TA03801, is recorded in columns 32-38.

Section 1, identified by the reference character 40, records general information about the target program, including such things as the number of test cases and the array sizing used.

Section 2, identified by the reference character 41, records specific information about each of the variables, with two lines dedicated to each variable. The comments indicate the data recorded it in each column of the file including the name of the variable to be monitored, its data type (B-Byte, C-Character, D-Double Word, H-Hexidecimal, I-Interger, L-Logical, P-Pointer, R-Real, W-Word, X-Hexidecimal Word, Y-Hexidecimal Double Word.) an array designator, an input designator, an output designator, and a scoping type (A-Argument, G-Global, L-Local, M-Module, @-Special scope for variable located "AT" a specific memory location). Column 78 is an all case designator which is a Y if that variable is used in all of the test cases. The second line, for instance 42 for the variable SEQ, indicates the test cases in which that variable is used. For instance, all four of the variables in the exemplary program are used in all three of the test cases.

Section 3, identified by the reference character 42, records the initial value for each of the variables for each of the test cases. In this instance the test cases are identified by the numerals 00,01, and 02.

Section 4 of the TGP information file list, identified by the reference character 43, lists the call of the unit being tested with the required argument list.

Section 5, identified by the reference character 44, lists the value expected for each output variable for each test case and provides and array index if the variable is an array.

A comment section, not shown, is provided as Section 6 for the user to add any test specific information to be noted during test execution.

The data generated by TGP is saved to a file with a 7 character identifier as the file name with the extension .VAR, for instance, TA02838.VAR. The interface management system used to input information provided by the user was developed in the exemplary system using the Forms Management System on a VAX 780 and a VAX 8600 computer. The source program for the rest generator processor was developed using rhe FORTRAN programming language, also on a VAX 780 and a VAX 8600.

The formatted file from TGP is used by the Test Data Processor (TDP) 13 to generate a software test specification 14 as well as test driver program. An example of the pertinent portions of a test driver program generated by TDP is illustrated in FIG. 11. After declaring the variables (not shown in FIG. 11), an execution loop statement 44 containing the number of test cases derived from the variable file is inserted. The test program is then assigned a block identifier of "1" by an ACTLINKS statement 45. This block number is written to the one dimensional block linkage array as the test program is executed to generate a tracer to the output indicating that the test program has been run. Next in FIG. 11, are the statements for inputting the assigned values for each variable in each test case and for writing the test case number along with the input values and expected values to the output file as indicated at 46.

The test driver program then calls 47 the procedure/function target code to be verifier along with the corresponding argument list from the variable file. This is followed by a statement 48 calling for instructions to control the output format and another ACTLINKS statement 49 indicating that the test program has been completed.

Finally the test driver program includes execution statements 50 which write output variable values and block linkages generated by each test case to the output file.

The software test specification generated by the Test Data Processor describes the test program identifying the expected block linkages for each test case, as well as providing a repeat of the input value and the inspected output values input earlier by the verifier. The software test specification (STS) file 14 does not contain program execution results, although it is still a very important part of the overall program documentation 19. Portions of the STS are illustrated in FIGS. 12 and 13. FIG. 12 illustrates rhe general input and output data. FIG. 13 illustrates one of the test cases, in this case, test case 0. The sequence of block execution is indicated as at 51. The "1"'s at the beginning and end of the sequence indicate execution of the test program itself. The STS also . indicates the values of the input variable 52 and the expected values of the output variable 53. A similar record is generated by STS for each test case.

At this point the target code at 8 has been conditioned so that the path of program execution and the input/output variable results will be recorded on an output file. A separate test driver program 15 has also been generated and calls the instrumented target code under test while also recording all the input/output variables on the same output file. A program Compile, Link and Locate processor (PCL) 16 links the instrumented target code which is the output of CIP 8 with the test driver program 15.

Actual execution of the test program 15 and target code is implemented utilizing SED processor 17. In the exemplary embodiment of the invention, in which a VAX computer was utilized for the processors, an emulator was employed to execute the PLM 86 code of the target program. Execution of the test driver program/target code results in writing to the test results output file 18 the actual output values generated and the block linkages for each test case. An example of the formatting output results is shown in FIG. 14. The final documentation 19 of the program verification process includes in addition to the test result file 18, the STS file 14 which defines the input value (s), expected output value (s), expected block linkage (s) and rationale for each test case to be performed, and the PCG output file 6 which identifies the pseudocode structure of the program to be verified along with its block numbers and . valid block linkages. This documentation is analyzed to determine for each test case that the program execution path was correct and the actual output values agree with those that were expected. In addition, the determination must be made that all execution paths were tested. This can be accomplished automatically by comparing the block numbers in the block data table with the block numbers written to the output file during test execution to assure that each block has been executed at least once. With the actual output values in agreement with the expected output values, and all of the possible branching combinations adequately considered, rhe target program has been verified.

Figure 15:
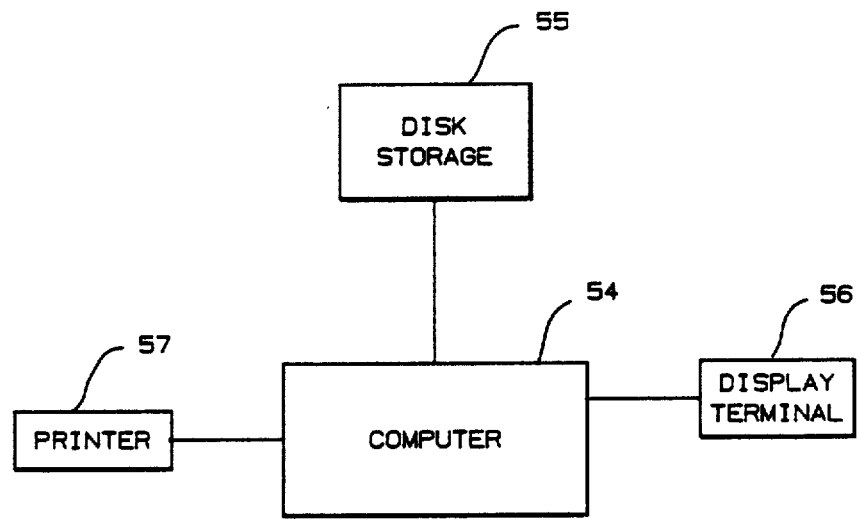
FIG. 15 illustrates schematically, in block diagram form, a system for carrying out the invention.

The verification process can be carried out utilizing a computer system such as that illustrated in FIG. 15. This system includes a general purpose digital computer 54, which in the exemplary system was a VAX computer. The processors as well as the target program are stored in disc storage 55. A display terminal 56 provides the interactive interface with the verifier for selection of the target unit and test case data. Hard copies of the results of the verification are generated on a printer 57.

The disclosed system automates the previously labor intensive complex task of preparing code to execute a sufficient number of test cases to adequately verify the target program. In addition the design of the system is such that each processor performs a part of the whole task, and consequently modifications to the system may be easily made through changes in the individual processors. Another benefit of the system is that the software verification process is necessarily made more uniform. This benefit exists regardless of the program to be tested or the verifier performing the test. Furthermore, the user-friendly format and codification of the verification process makes it possible for one of less skill to perform the necessary software verification. Finally, the system is capable, with modifications, of software verification of programs written in any computer language and for any application.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of verifying a computer source code having a series of program statements, including control statements which provide for branching to alternative statements of the code, said method comprising:

instrumenting the source code to generate when the code is executed an indication for each block of code that the statements of that block have been executed, a block of code being the program statements between control statements;

selecting test cases, with each test case comprising input values for variables in the source code, said test cases being selected such that each block of code is executed;

generating a test driver routine to implement the test cases;

compiling and linking the test driver routine with the instrumented source code;

executing the compiled/linked code to implement the test cases, and generating an output with said indication of each block of code which has been executed by the test cases.

2. The method of claim 1 wherein said step of generating said test cases includes determining expected output values for each test case, and wherein the step of generating an output includes generating a representation of the expected output values and actual output values generated by executing the compiled/linked code.

3. The method of claim 1 wherein said step of instrumenting said source code comprises operating a processor to insert into each block of code an executable instruction to write to an output file an identifier for that block when the statements of that block are executed, and wherein the step of generating an output includes generating from said output file a list of block identifiers in the sequence in which said blocks were executed.

4. The method of claim 3 wherein said step of inserting executable write instructions into each block of code includes inserting at the beginning of the block such a statement to write to said output file an identifier assigned to the block, and inserting at the end of the block such a statement to sequentially write to the output file the identifier of the block to which control reverts.

5. The method of claim 4 wherein the step of instrumenting the code comprises operating a processor to insert into each block of code non-executable comments identifying the beginning and the end of the block and wherein said steps of inserting the write instructions comprises inserting the instruction which writes the block identifier immediately after the non-executable comment identifying the beginning of the block, and inserting the instruction which writes the block identifier to which control reverts immediately prior to the comment identifying the end of the block.

6. The method of claim 5 including generating from said control statements and said block comments a block data file indicating the path by which each block is entered and identifying those blocks which loop back, and wherein said step of inserting write statements into the code utilizes said block data file to determine the block to which control reverts when the statements in the block have been executed.

7. The method of claim 4 wherein said instrumentation step includes generating a block linkage table, identifying the possible branchings from one block of code to another.

8. The method of claim 3 including the steps of generating a pseudocode by operating a processor to generate from the source code a separate listing with only control statements and with comments between the control statements containing the same block identifiers as used by the executable instructions for corresponding blocks of code in the instrumented code, said pseudocode being used to select said test cases to assure that every block of code is executed.

9. The method of claim 3 including the step prior to instrumenting the source code of standardizing the format of the source code to a set of prescribed formatting standards to generate a reformatted source code, and then instrumenting said reformatted source code.

10. The method of claim 3 wherein said source code contains an instruction that calls for an external program, and wherein said instrumentation step includes inserting prior to said call instruction an instruction to write to an output file an indication that the external program is to be called, and inserting after said call instruction, an instruction to write to the output file an indication that the source code being verified has been reentered.

11. The method of claim 10 wherein said instrument in step includes the steps of inserting into said source code before and after said call instruction, instructions to write to the output file the values of at least selected ones of the source code variables, and wherein said step of generating an output includes generating from the output file representations of the values of said selected variables before and after the call.

12. A method of verifying a computer program source code having a series of program statements including control statements by which the program can branch to alternative statements, said method comprising:
   size the format of
   operating a processor to standard the source code to a set of prescribed formatting standards to generate a reformatted source code;
   selecting a target unit of the reformatted source code for verification;
   instrumenting said target unit of code by operating a processor to divide said target unit into blocks of code, a block of code being the non-control statements between control statements, and to insert into said blocks of code executable instructions to write to an output file an identifier for each block of code when it is executed;
   selecting test cases for said target unit of code with each test case comprising input values for variables in the target unit and expected output values, said test cases being selected such that each block of code in the test unit is executed;
   operating a processor to generate a test driver routine to implement said test cases;
   operating a processor to compile and link the test driver routine with the instrumented target unit of code;
   executing the compiled/linked test driver routine and instrumented target unit of code; and
   generating an output presenting actual output values and expected output values for each test case, and a sequential listing from said output file of the block identifiers of the blocks of said target unit code in the sequence in which they were executed.

13. The method of claim 12 wherein said instrumenting step includes operating a processor to insert nonexecutable comments with a unique block identifier at the beginning and the end of each block of code in the target unit, generating from the control statements and said block comments a block data table identifying the block by which each block is entered, the nesting level of the block, and any loop backs in a block and wherein the step of inserting executable write instructions into each block includes using said comments and block data table to insert . at the beginning of each block an instruction to write the block identifier and to insert at the end of each block an instruction to write the block identifier of the block to which the target unit reverts.

14. The method of claim 13 wherein the step of generating an output includes generating a comparison of the block identifiers written to the output file during execution of a block of code and the block identifiers in the block data table.

15. The method of claim 13 wherein said instrumenting step includes generating a block linkage file identifying all possible transitions between blocks of code in the target unit.

16. The method of claim 13 wherein the target unit of code includes a call instruction calling an external routine, and wherein said instrumenting step includes: inserting an executable instruction before the call instruction to write to the output file an indication of the call and inserting after the call instruction an executable instruction to write to the output file an indication that the program has returned to the target unit of code at the correct location.

17. The method of claim 16 wherein said instrumenting step includes inserting into the target unit before and after said call instruction, instructions to write to the output file the values of at least selected ones of the target code variables, and wherein said step of generating an output includes generating from the output file representations of the values of said selected variables before and after the call.

18. The method of claim 13 including generating a pseudocode for use in selecting said test cases by operating a processor to generate a separate file containing only the control statements of the target unit with nonexecutable comments inserted in place of the non control statements, said comments identifying said blocks with the same identifiers as the comments inserted in the target code by said instrumenting step.

19. The method of claim 12 wherein the step of selecting test case includes operating a processor to generate a variable file for the test cases listing input and output variables for each test case along with the input value for each input variable and the expected value for each output variable, and said method further including when a program revision calls for a change in a designated variable, searching said variable file to identify the test cases which utilize said designated variable.

20. The method of claim 12 wherein said step of operating a processor to generate a test driver routine includes generating a software test specification listing the values of variables used by the test driver to implement the test cases and the expected values of output parameters.

21. A method of verifying software for microprocessors in control and protection systems for a nuclear power plant wherein said software comprises source code having a series of program statements, including . control statements by which the program can branch to alternative statements, said method comprising:
   loading said source code into a general purpose digital computer;
   operating said digital computer to standardize the format of the source code in accordance with a set of prescribed formatting standards to generate a reformatted source code;
   selecting a target unit of the reformatted of the source code for verification;

operating said digital computer to instrument said target unit of code by dividing said target unit into blocks of code, a block of code being the non-control statements between control statements, and to insert into the beginning of each block of code an instruction to write to an output file a unique identifier for that block of code when it is executed, and to insert at the end of each block of code an instruction to write to the output file the unique identifier of the block of code to which the target unit reverts;

selecting test cases for said target unit of code with each test case comprising input values for variables in the target unit and expected output values, said test cases being selected such that each block of code in the test unit is executed;

operating said digital computer to generate a test driver routine to implement said test cases;

operating the digital computer to compile and link the test driver routine with the instrumented target unit of code; operating the digital computer to execute the compiled/linked test driver routine and instrumented target unit of code; and operating the digital computer to generate an output presenting actual output values and expected output values for each test case, and a sequential listing from said output file of the block identifiers of the blocks of said target unit code in the sequence in which they were executed.

22. The method of claim 21 wherein the target unit of code includes a call instruction calling an external routine, and wherein said digital computer is operated to insert an executable instruction before the call instruction to write an indication of the call to the output file and inserting after the call instruction an indication that the program has returned to the target unit of code at the correct location.

23. A system for verifying computer program source code having a series of statements, including control statements by which the program can branch to alternative statements, said system comprising:

means for instrumenting the source code by dividing the code into blocks of code, a block of code being the non-control statements between control statements, and to insert into said blocks of code executable instructions to write to an output file an identifier for each block of code when it is executed;

means for generating a variable file containing the input value of selected input variables of the source code and expected output values for output variables of the source code for selected test cases, said test cases being selected such that each block of code is executed;

means for generating a test driver routine utilizing the values in the variable file to implement the test cases;

means for compiling and linking the test driver routine with the instrumented source code;

means for executing the compiled/linked test driver routine and the instrumented source code to generate actual output values and to write to the output file an identifier for each block of each executed; and means for generating an output presenting said actual output values generated by said executing means and the expected output values contained in said variable file for each test case, and a sequential listing from said output file of the block identifiers of the blocks of said source code in the sequence in which they were executed.

24. The system of claim 23 including:

means to reformat the source code to a set of prescribed formatting standards to generate a reformatted source code; and means for selecting a target unit of the reformatted source code for instrumentation by said instrumenting means.

* * * * *